United States Patent
Matsui

(10) Patent No.: US 9,132,546 B2
(45) Date of Patent: Sep. 15, 2015

(54) ROBOT CONTROL APPARATUS

(75) Inventor: Norio Matsui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 80 days.

(21) Appl. No.: 14/007,594

(22) PCT Filed: Apr. 14, 2011

(86) PCT No.: PCT/JP2011/059298
§ 371 (c)(1),
(2), (4) Date: Sep. 25, 2013

(87) PCT Pub. No.: WO2012/140770
PCT Pub. Date: Oct. 18, 2012

(65) Prior Publication Data
US 2014/0018959 A1      Jan. 16, 2014

(51) Int. Cl.
*G05B 19/18* (2006.01)
*B25J 9/16* (2006.01)

(52) U.S. Cl.
CPC .............. *B25J 9/1612* (2013.01); *B25J 9/1666* (2013.01)

(58) Field of Classification Search
USPC .......... 700/245, 250, 251, 255, 259; 901/1, 8, 901/31, 46, 47
See application file for complete search history.

(56) References Cited

U.S. PATENT DOCUMENTS

| | | | |
|---|---|---|---|
| 5,325,468 A * | 6/1994 | Terasaki et al. | 700/262 |
| 5,513,299 A | 4/1996 | Terasaki et al. | |
| 6,597,971 B2 * | 7/2003 | Kanno | 700/245 |
| 7,187,998 B2 * | 3/2007 | Okamoto et al. | 700/245 |
| 2002/0169522 A1 * | 11/2002 | Kanno | 700/245 |
| 2006/0111811 A1 * | 5/2006 | Okamoto et al. | 700/214 |
| 2010/0272547 A1 | 10/2010 | Cottone et al. | |

FOREIGN PATENT DOCUMENTS

| | | |
|---|---|---|
| DE | 102007026956 A1 | 12/2008 |
| JP | 04-167104 A | 6/1992 |

(Continued)

OTHER PUBLICATIONS

Taiwanese Office Action, Aug. 28, 2013, Application No. 100122403.

(Continued)

*Primary Examiner* — Khoi Tran
*Assistant Examiner* — Jorge Peche
(74) *Attorney, Agent, or Firm* — Sughrue Mion, PLLC; Richard C. Turner

(57) ABSTRACT

A robot control apparatus, which causes a robot to use its hand to grasp and move a workpiece detected by a workpiece detection unit, has a storage unit and a control unit. A non-interference area in which no interference occurs between the hand and a surrounding environment and a work area through which the hand potentially passes when grasping the workpiece are stored as a parameter in the storage unit. The control unit computes, based on a position and an attitude of the detected workpiece and the parameter regarding the work area, a position and an orientation of the work area with reference to the position of the detected workpiece. Moreover, the control unit computes an overlap between a surrounding environment area excluding the non-interference area and the work area having the computed position and orientation. If there is the overlap, the control unit executes a predetermined operation.

14 Claims, 9 Drawing Sheets

(56) References Cited

FOREIGN PATENT DOCUMENTS

| | | |
|---|---|---|
| JP | 05-324032 A | 12/1993 |
| JP | 2000-039912 A | 2/2000 |
| JP | 2002-331480 A | 11/2002 |
| JP | 2006-346790 A | 12/2006 |
| JP | 2010-155310 A | 7/2010 |

OTHER PUBLICATIONS

Communication dated Feb. 27, 2015 from the German Patent and Trademark Office in counterpart application No. 112011105151.4.

Communication dated Nov. 25, 2014, issued by the State Intellectual Property Office of the People's Republic of China in counterpart Application No. 201180070011.1.

* cited by examiner

SET DIMENSION, Nx, Ny, Nz, Na, Nb, Nc

SET DIMENSION, Nr, Nz, Na, Nb, Nc

SET DIMENSION, Nr, Nz, Na, Nb, Nc

SET DIMENSION, Nr1Nr2, Nz, Na, Nb, Nc

FIG.10

| INSTRUCTION | CONTROL CONTENTS |
|---|---|
| VS ON | ACTIVATE VISION SENSOR |
| : | : |
| VSRED | READ VISION DATA |
| : | : |
| MOV P0 | MOVE TO POSITION P0 |
| ARECKON | START AREA-INTERFERENCE CHECK OPERATION |
| : | : |
| MOV P1 | MOVE TO POSITION P1 |
| MOV P2 | MOVE TO POSITION P2 |
| ARECKOF | END AREA-INTERFERENCE CHECK OPERATION |
| HAND OP | CONTROL HAND |
| : | : |
| MOV P1 | MOVE TO P1 |
| : | : |

422

ROBOT CONTROL APPARATUS

CROSS REFERENCE TO RELATED APPLICATIONS

This application is a National Stage of International Application No. PCT/JP2011/059298 filed Apr. 14, 2011, the contents of all of which are incorporated herein by reference in their entirety.

FIELD

The present invention relates to a robot control apparatus.

BACKGROUND

Conventionally, with respect to a target workpiece recognized by a three-dimensional vision sensor, a robot control apparatus connected to a robot and the three-dimensional vision sensor moves the robot from an upward-position above a pick-up position to a position where the target workpiece is detected, and picks up the target workpiece by using a hand attached to an end of an arm of the robot. In this case, the robot control apparatus performs the operation of picking up the target workpiece by moving the arm so as to move the hand from the upward-position to the position where the target workpiece is recognized and detected by the three-dimensional vision sensor.

When the hand is moved in a linear manner from the upward-position to the position where the target workpiece is recognized and detected by the three-dimensional vision sensor, there is a possibility that the move is interfered with by a surrounding environment (such as peripheral jigs and a box in which the target workpiece is placed). In this case, it is necessary to calculate a non-interference area with avoiding the interference area to move the hand from the upward-position to the position where the target workpiece is detected.

Since various cases are supposed as the surrounding environment where the robot is placed, it is necessary in each case to generate a specific program (a control procedure using a language created for managing conditions of the robot move) appropriate to the surrounding environment, in order to calculate the non-interference area with avoiding the interference area to move the hand. Furthermore, if the surrounding environment has a complicated shape or if the surrounding environment is changed or added during a process, it causes a troublesome task to modify the program.

Patent Literature 1 discloses a technique that divides a space adjacent to a grasp target into space cones each having a predetermined size and a vertex at a grasp position, selects an open space cone that does not interfere with a surrounding object from the space cones, calculates a distance from the surrounding object to the selected open space cone, and determines a grasp attitude based on the distance.

CITATION LIST

Patent Literature

Patent Literature 1: Japanese Patent Application Laid-open No. H4-167104

SUMMARY

Technical Problem

However, an attitude and a moving direction of the arm are fixed when moving from the upward-position to the grasp position. Therefore, when considering the interference with the surrounding environment at the time of the move from the upward-position to the grasp position, to consider the interference with the surrounding environment in all directions by using a polyhedron having a center at the pick-up position and consisting of a plurality of space cones, as in the case of the Patent Literature described above, causes increase in processing load of the robot processing apparatus and thus decrease in processing speed, which are problems.

The present invention has been achieved in view of the above, and an object of the present invention is to achieve a robot control apparatus in which an operation description program needs not to be modified depending on a surrounding environment.

Solution to Problem

To solve the above-mentioned problems and achieve the object, the present invention provides a robot control apparatus that causes a robot provided with a hand on an end of an arm to perform a pick-up operation that uses the hand to grasp and move a workpiece detected by a workpiece detection unit. The robot control apparatus has: a parameter storage unit configured to store, as a parameter, each of a non-interference area in which no interference occurs between the hand and a surrounding environment and a work area through which the hand potentially passes when grasping the workpiece; a program execution unit configured to execute an operation description program including a sequence of instructions described corresponding to procedures of the pick-up operation to cause the robot to drive the arm to move the hand; a work area computation unit configured to read the parameter regarding the work area from the parameter storage unit and to compute, based on a position and an attitude of the workpiece obtained from the workpiece detection unit, a position and an orientation of the work area; an overlap computation unit configured to read the parameter regarding the non-interference area from the parameter storage unit and to compute an overlap between a surrounding environment area excluding the non-interference area and the work area having the position and the orientation computed by the work area computation unit; and an interference-accompanying operation execution unit configured to execute, if there is the overlap between the surrounding environment area and the work area having the position and the orientation computed by the work area computation unit, a predetermined operation as an interference-accompanying operation when the hand goes into the work area.

Advantageous Effects of Invention

The robot control apparatus according to the present invention can set, as a parameter separately from an operation description program, an interference area where a hand going thereinto causes interference with a surrounding environment and a shape of a work area through which the hand potentially passes when grasping a workpiece. Therefore, an effect that there is no need to modify the operation description program depending on the surrounding environment can be obtained.

BRIEF DESCRIPTION OF DRAWINGS

FIG. 10 depicts an example of an operation description program.

DESCRIPTION OF EMBODIMENTS

Exemplary embodiments of a robot control system according to the present invention will be described in detail below by reference to the attached drawings. It should be noted that the present invention is not limited to the embodiments.

Embodiment

Figure 1:
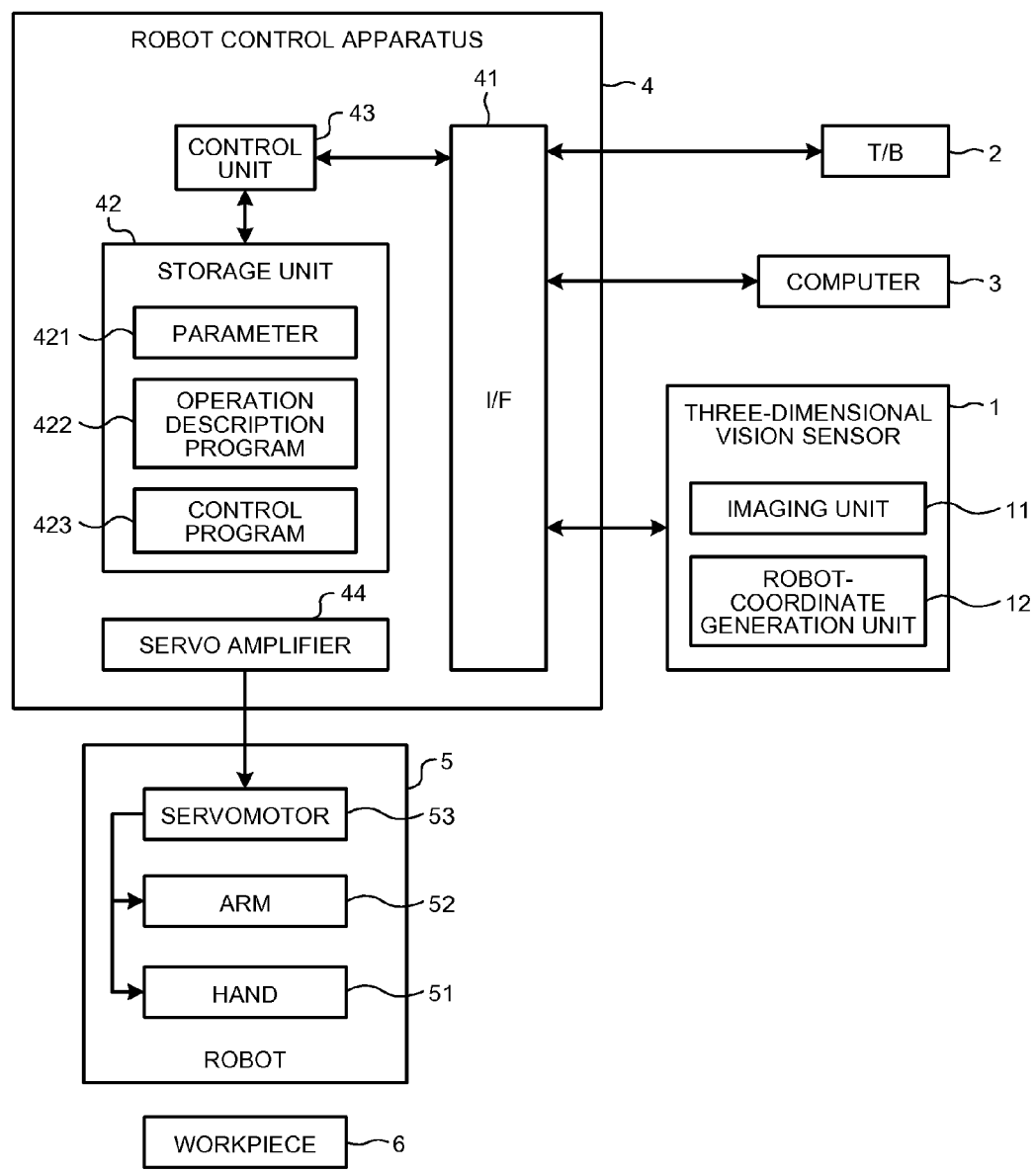
FIG. 1 depicts a configuration of a robot control system using an embodiment of a robot control apparatus according to the present invention.

FIG. 1 depicts a configuration of a robot control system using an embodiment of a robot control apparatus according to the present invention. The robot control system has a three-dimensional vision sensor 1, a teaching box (T/B) 2, a computer 3, a robot control apparatus 4, and a robot 5, and performs an operation of causing the robot 5 to grasp and move a workpiece 6.

The three-dimensional vision sensor 1 being a workpiece detection unit has: an imaging unit 11 that takes an image to generate an image data; and a robot-coordinate generation unit 12 that processes the image data generated by the imaging unit 11 to generate a robot-coordinate data.

The robot control apparatus 4 has: an interface (I/F) 41 for data transmission/reception to/from the three-dimensional vision sensor 1, the T/B 2, and the computer 3; a storage unit 42 that stores therein various types of parameter 421, an operation description program 422, and a control program 423; a control unit 43 that executes the operation description program 422 and the control program 423; and a servo amplifier 44 that outputs a control signal to a servomotor included in the robot 5.

The parameter 421 is stored in the storage unit 42 being a parameter storage unit by an initial setting which will be described later. The operation description program 422 is a program list that describes operations that cause the robot 5 to automatically perform a pick-up operation that uses a hand 51 to grasp and move the workpiece 6 detected by the three-dimensional vision sensor 1, and includes a sequence of instructions (commands) described corresponding to procedures of the pick-up operation. The control program 423 indicates instructions that are transmitted to the servo amplifier 44 for causing the robot 5 to operate in accordance with the command executed in the operation description program 422 or an operation by the use of the T/B 2. The servo amplifier 44 drives a servomotor (not shown) installed on the robot 5 to cause the robot 5 to perform a predetermined operation.

The computer 3 is used as a user interface for inputting data such as the parameter 421, creating the operation description program 422, performing alarm display which will be described later, and the like.

The T/B 2 is an input interface for controlling the robot 5 by a manual operation.

The robot 5 has: the hand 51 for grasping the workpiece 6; an arm 52 for moving the hand 51 to an arbitrary position in a non-interference area; and a servomotor 53 that drives the hand 51 and the arm 52. The servomotor 53 is driven by a control signal from the servo amplifier 44 and thereby the hand 51 and the arm 52 are driven.

In the above-mentioned configuration, when a command in the operation description program 422 that moves the hand 51 to a certain position is executed, the control unit 43 transmits a command to the servo amplifier 44 based on an instruction stored as the control program 423 to cause the servo amplifier 44 to output a control signal, thereby driving the servomotor 53 of the robot 5 to drive the arm 52 to move the hand 51.

In an initial setting, a non-interference area, a work area, an interference-accompanying operation, and whether an area-interference check is performed or not are set.

Figure 2:
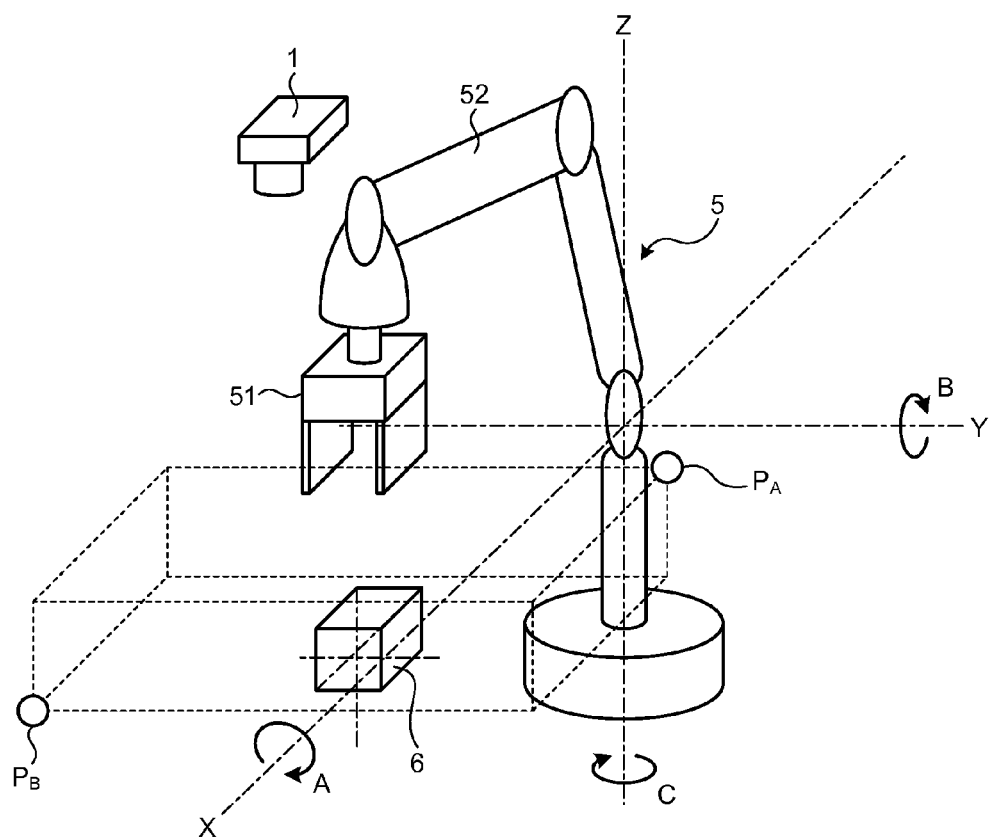
FIG. 2 depicts an example of setting of a non-interference area.

The non-interference area, which is an area in which the hand can be moved without causing interference with the surrounding environment, is set as the parameter 421 in the storage unit 42 by the initial setting. The non-interference area is set by specifying its coordinate position and dimension with numerical values. FIG. 2 depicts an example of setting of the non-interference area. In a case where a coordinate system with respect to the robot 5 is a six-axis coordinate system including X, Y, Z, A, B, and C, specifying two points ($P_A$ and $P_B$ in the example shown in FIG. 2) in the coordinate space enables setting the non-interference area to be a cuboid having the specified two points as vertexes. Here, X, Y, and Z represent distances from a coordinate origin (for example, a base of the arm 52) in an X-direction, a Y-direction, and a Z-direction, respectively, and A, B, and C represent rotation angles around the X coordinate axis, the Y coordinate axis, and the Z coordinate axis, respectively. As a result, a space excluding the non-interference area can be set as a surrounding environment area (an interference area) in an indirect manner. It should be noted that a surrounding environment area having a complicated shape can be set as well by setting a plurality of non-interference areas.

Figure 3A:
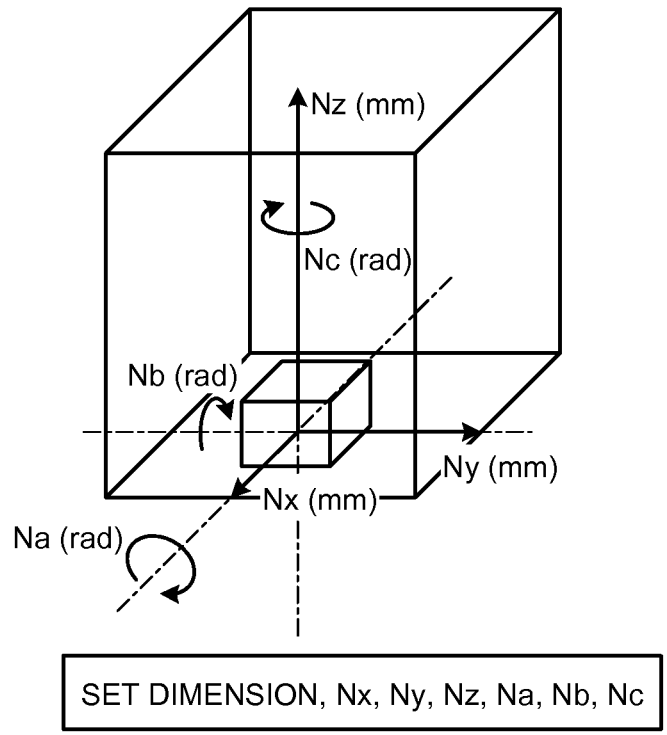
FIG. 3A depicts an example of setting a work area to be a cubic shape.
Figure 3B:
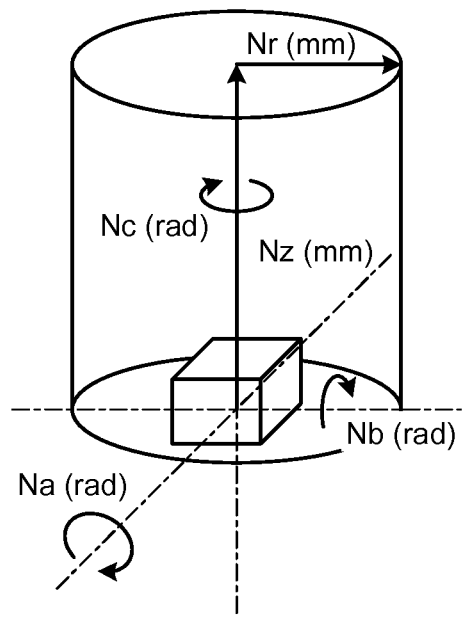
FIG. 3B depicts an example of setting a work area to be a cylindrical shape.
Figure 3C:
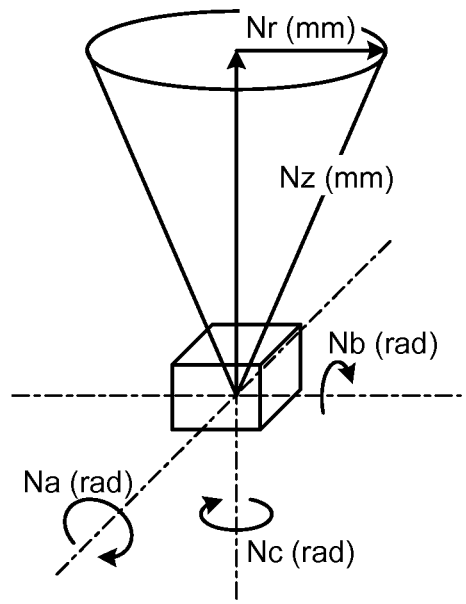
FIG. 3C depicts an example of setting a work area to be a conical shape.
Figure 3D:
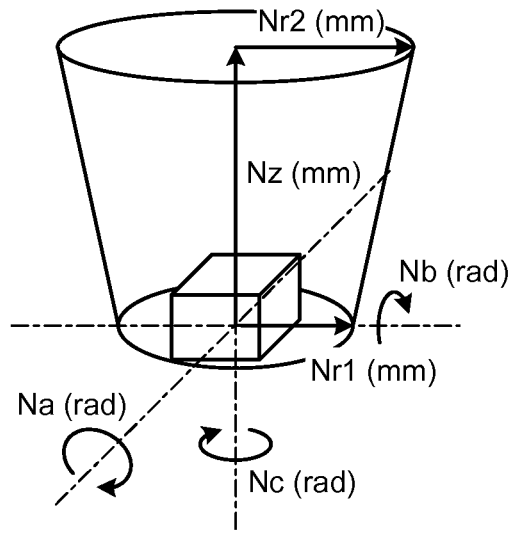
FIG. 3D depicts an example of setting a work area to be a partial conical shape (tapered columnar shape) without a vertex side portion.

The work area is an area through which the hand 51 is assumed to potentially pass when grasping the workpiece 6 detected by the three-dimensional vision sensor 1. What kind of shape (cube, cylinder, circular cone) and size with reference to a position of the workpiece detected by the three-dimensional vision sensor 1 shall be employed is set. Publicly known methods can be applied for defining an area having a geometric shape in a space. For example, in order to define an area having a conical shape, just a height, a base radius, and an axial direction are to be specified. FIG. 3A depicts an example of setting the work area to be a cubic shape. FIG. 3B depicts an example of setting the work area to be a cylindrical shape. FIG. 3C depicts an example of setting the work area to be a conical shape. FIG. 3D depicts an example of setting the work area to be a partial conical shape (tapered columnar shape) without a vertex side portion.

Figure 4:
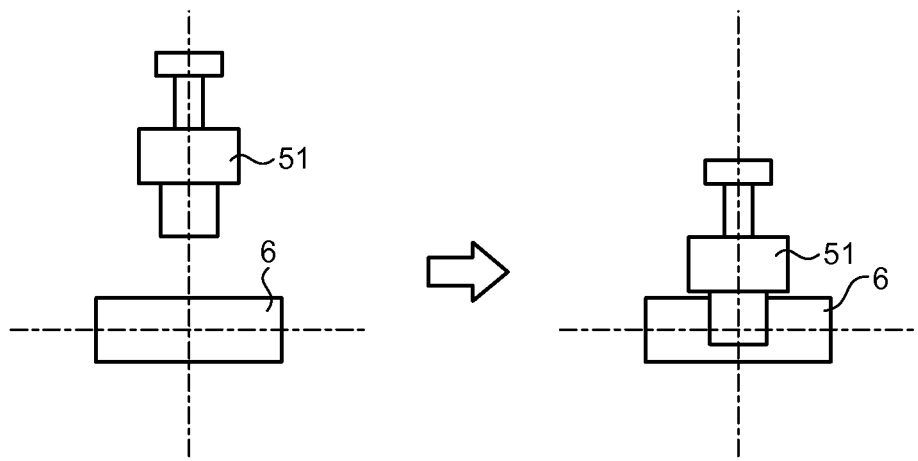
FIG. 4 depicts an example of a situation where a hand picks up a workpiece that is not inclined.

FIG. 4 depicts an example of a situation where the hand 51 picks up the workpiece 6 that is not inclined. In the case where the workpiece 6 is not inclined, the hand 51 is placed at an upward-position which is away from the workpiece 6 for a predetermined distance in a vertically upward direction, and then moved to a grasp position to grasp the workpiece 6. Therefore, in this case, the work area is provided vertically upward from the workpiece 6.

Figure 5:
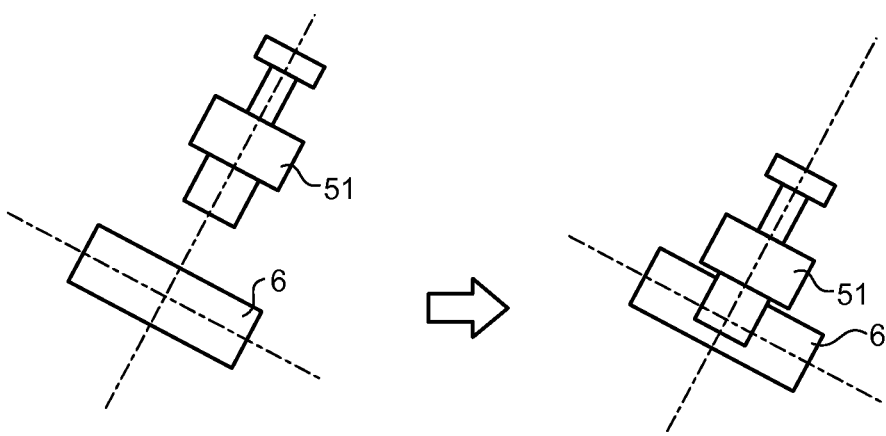
FIG. 5 depicts another example of a situation where a hand picks up a workpiece that is inclined.

FIG. 5 depicts an example of a situation where the hand 51 picks up the workpiece 6 that is inclined. In the case where the workpiece 6 is inclined, the hand 51 is inclined corresponding to the inclination of the workpiece 6, placed at an upward-position which is away from the workpiece 6 for a predetermined distance in a normal direction, and then moved to a grasp position to grasp the workpiece 6. Therefore, in this case, the work area is provided obliquely upward from the workpiece 6.

Figure 6:
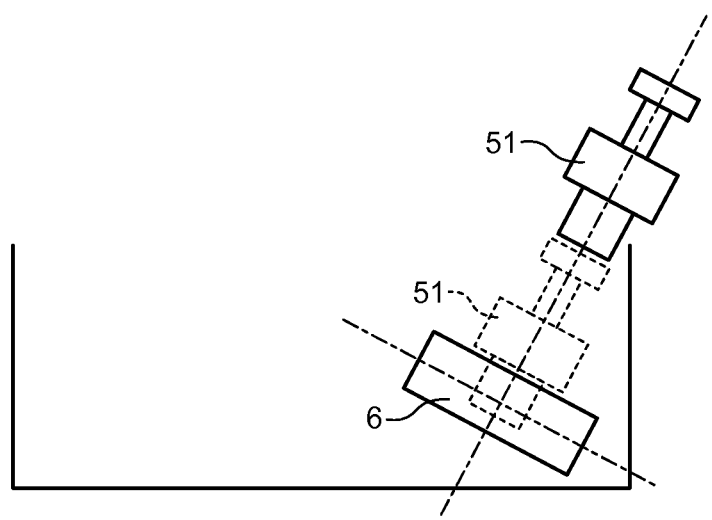
FIG. 6 depicts an example of a situation where a hand interferes with a surrounding environment when picking up a workpiece.
Figure 7:
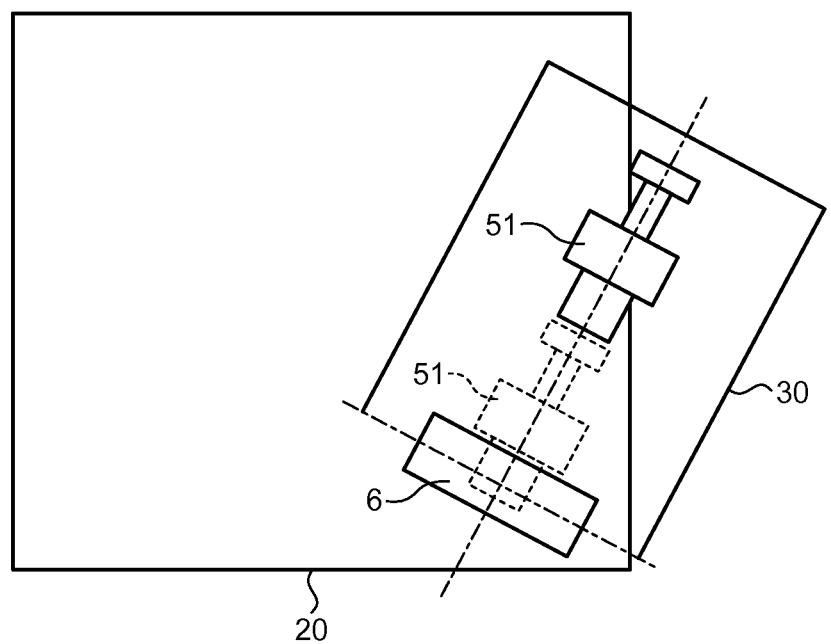
FIG. 7 depicts an example of a case where there is an overlap between a surrounding environment area and a work area.
Figure 8:
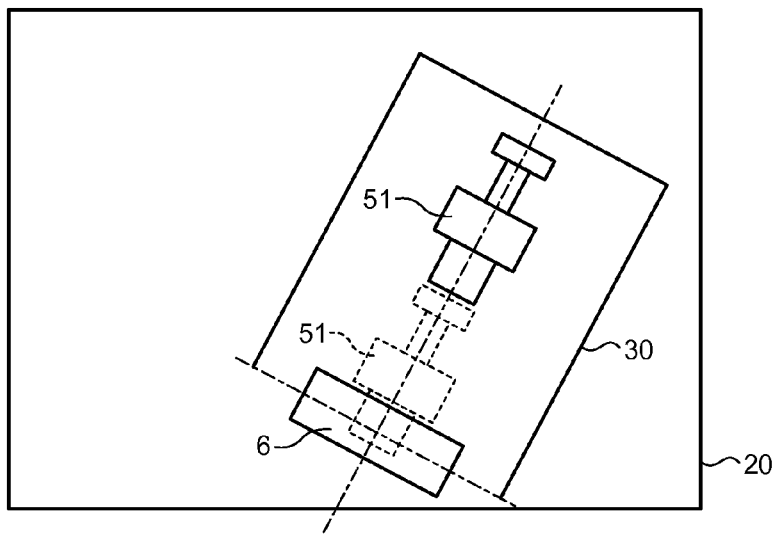
FIG. 8 depicts an example of a case where there is no overlap between a surrounding environment area and a work area.

FIG. 6 depicts an example of a situation where the hand interferes with the surrounding environment when picking up the workpiece 6. In a case where the workpiece 6 is inclined, there is a possibility that the hand 51 interferes with the surrounding environment when moving to the upward-position or moving from the upward-position to the grasp position, even if no interference with the surrounding environment occurs at the grasp position and the upward-position. If there is an overlap between the surrounding environment area and the work area, that is, if the work area protrudes from the non-interference area, it can be determined that the hand 51 potentially interferes with the surrounding environment. FIG. 7 depicts an example of a case where there is an overlap between the surrounding environment area and the work area. A work area 30 that is provided obliquely upward from the workpiece 6 protrudes from a non-interference area 20, and the hand 51 interferes with the surrounding environment. FIG. 8 depicts an example of a case where there is no overlap between the surrounding environment area and the work area. A work area 30 that is provided obliquely upward from the workpiece 6 does not protrude from a non-interference area 20, and it can be determined that there is no possibility that the hand 51 interferes with the surrounding environment.

The interference-accompanying operation indicates what kind of processing is to be performed as the interference-accompanying operation in the case where there is a possibility that moving the hand 51 causes interference with the surrounding environment. For example, processing of preventing the hand 51 from moving by an error stop, processing of performing an alarm display and then continuing the move of the hand 51, and the like are set.

In a case of a setting where the area-interference check is performed (i.e. an operation mode is set such that the area-interference check is performed), an area-interference check operation is always performed when moving the hand 51 during an automatic operation, regardless of the description in the operation description program 422. In a case of a setting where the area-interference check is not performed, an area-interference check operation is not performed. However, if an area-interference check start instruction is included in the operation description program 422, the area-interference check operation is performed after the instruction is executed until an area-interference check end instruction in the operation description program 422 is executed. In the case where the area-interference check operation is performed in accordance with the area-interference check instruction in the operation description program 422 as described above, the non-interference area and the surrounding environment area may be set in the operation description program 422. It is also possible to set the non-interference area and the surrounding environment area by both the parameter 421 and the operation description program 422. It is also possible to set the work area by the operation description program 422.

Figure 9:
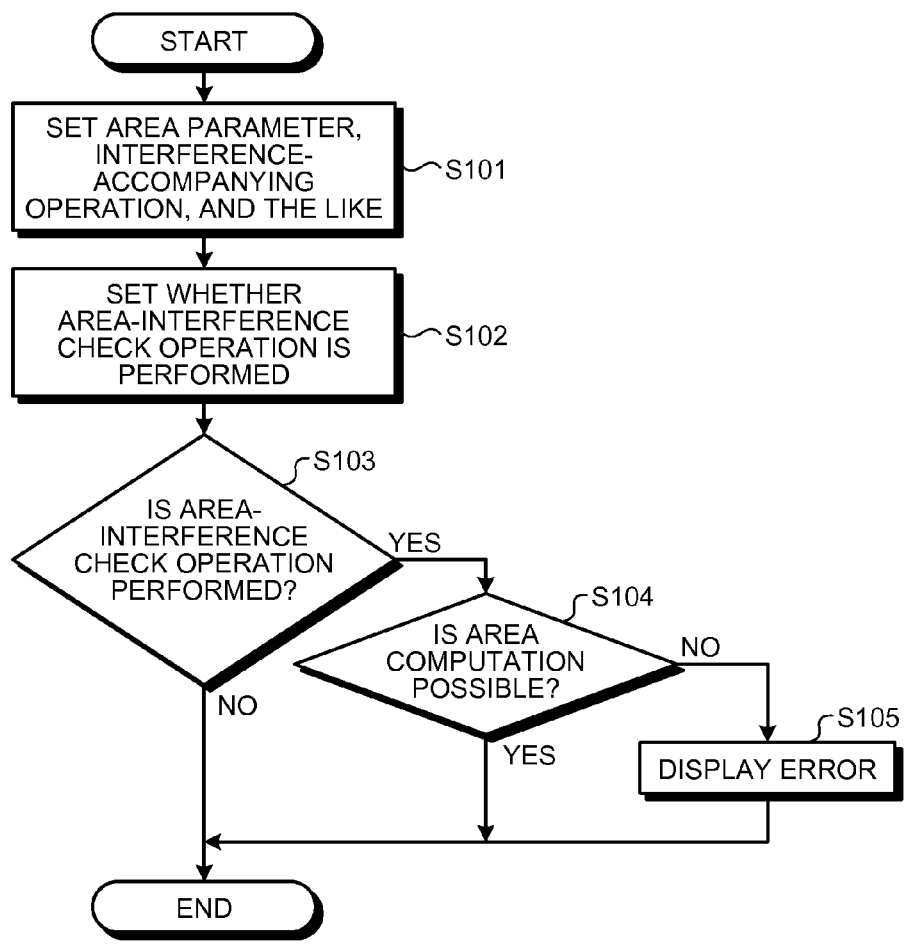
FIG. 9 is a flow chart showing an initial setting.

FIG. 9 is a flow chart showing the initial setting. First, the area parameter, the interference-accompanying operation and the like are input by using the computer 3, and the parameter 421 is stored in the storage unit 42 (Step S101). Moreover, whether the area-interference check is performed or not also is stored as the parameter 421 in the storage unit 42 (Step S102). After such the setting is completed, the control unit 43 checks whether or not the area-interference check operation is set to be performed (Step S103). In a case where the area-interference check operation is set not to be performed (Step S103/NO), the initial setting ends. In a case where the area-interference check operation is set to be performed (Step S103/YES), whether or not both an external environment the non-interference area and the work area are being set as the parameter 421 is checked (Step S104). If at least one of them is not set (Step S104/NO), an error indicating that the area-interference check operation cannot be performed is displayed, and the setting of performing the area-interference check operation is then changed to be invalid (Step S105). After that, the initial setting ends. If both of them are set (Step S104/YES), the area-interference check operation can be performed and thus the initial setting ends without displaying any error.

Next, an operation of the robot 5 at the time of an automatic operation will be described below. The control unit 43 functions as a program execution unit to execute the operation description program 422. As a result, the robot 5 operates to perform the pick-up operation in a manner according to the operation description program 422 with respect to the workpiece 6 whose position and attitude (inclination) are detected by the three-dimensional vision sensor 1. When the area-interference check operation based on the areas set in the parameter 421 or the operation description program 422 is activated, the control unit 43 functions as a work area computation unit to compute the work area. Moreover, the control unit 43 functions also as an overlap computation unit to compute an overlap between the surrounding environment area and the work area. When moving the hand 51 to the upward-position, the control unit 43 determines, based on a result of the area computation, whether or not the hand 51 can operate without causing interference with the surrounding environment. If it is possible, the control unit 43 continues the operation without outputting an error. If there is a possibility that the hand 51 interferes with the surrounding environment, the control unit 43 functions as an interference-accompanying operation execution unit to perform a predetermined operation specified as the interference-accompanying operation (such as the error stop of the robot 5, alarm display and the like) when the hand 51 goes into the work area.

FIG. 10 depicts an example of the operation description program 422. In the example shown in FIG. 10, described in the operation description program 422 is an operation that moves the hand 51 to a predetermined position P0 within the non-interference area, then moves the hand to an upward-position P1, further moves the hand 51 to a grasp position P2, controls the hand 51 to grasp the workpiece 6, and then moves the hand 51 to the upward-position P1. In this example, instructions to start and end the area-interference check operation (area-interference check operation execution instruction) are included in the operation description program 422. Accordingly, the area-interference check operation is executed when the hand 51 is moved from P0 to the upward-position P1 and when the hand 51 is moved from the upward position P1 to the grasp position P2, regardless of the setting by the parameter 421.

Figure 11:
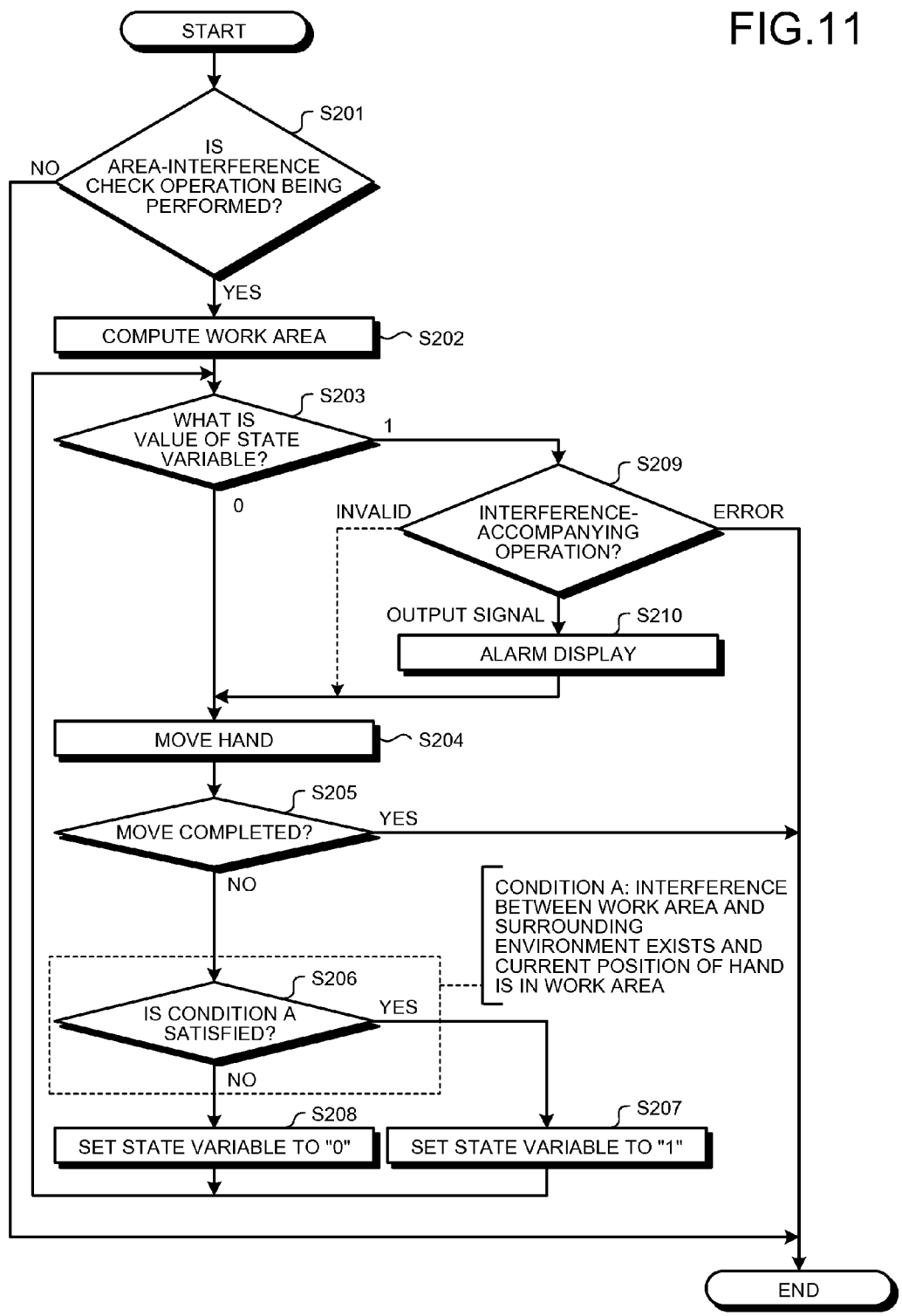
FIG. 11 is a flow chart showing an operation of the robot control apparatus at a time of an area-interference check operation.

FIG. 11 is a flow chart showing an operation of the robot control apparatus 4 at the time of the area-interference check operation. When the area-interference check operation is not being performed, the process ends without any processing (Step S201/NO). When the area-interference check operation is started (Step S201/YES), the control unit 43 functions as the work area computation unit to compute the work area based on the coordinate position of the workpiece input from the three-dimensional vision sensor 1 and the shape set in the parameter 421 or the operation description program 422. Moreover, the control unit 43 functions also as the overlap computation unit to read the parameter 421 regarding the non-interference area from the storage unit 42 for setting the surrounding environment area in an indirect manner and compute an overlap between the surrounding environment area and the work area (Step S202).

Next, the control unit 43 checks a value of a state variable (Step S203). The state variable is a variable that is set to "1" if there is an overlap between the work area and the surrounding environment area and a current position of the hand 51 is within the work area and otherwise set to "0". Let us consider a case where an initial value of the state variable is "0". In the case where the state variable is "0" (Step S203/0), there is no possibility that the move of the hand 51 causes interference with the surrounding environment and thus the control unit 43 drives the servomotor of the robot 5 by using the servo amplifier 44 to move the arm 52 to move the hand 51 (Step S204). After moving the hand 51, the control unit 43 determines whether or not the hand 51 has reached a position specified by the operation description program 422 (Step S205). If the hand 51 has reached the position specified by the operation description program 422 (Step S205/YES), the process ends.

If the hand 51 has not reached the position specified by an instruction in the operation description program 422 (Step S205/NO), the control unit 43 checks whether or not an overlap between the work area and the surrounding environment area exists and the current position of the hand 51 is within the work area (Step S206). If there is an overlap between the work area and the surrounding environment area and the current position of the hand 51 is within the work area (Step S206/YES), the state variable is set to "1" (Step S207), and otherwise (Step S206/NO), the state variable is set to "0" (Step S208). After that, the process returns back to Step S203.

In the case where the value of the state variable checked is "1" (Step S203/1), the interference-accompanying operation that is set as the parameter 421 is checked (Step S209). If the interference-accompanying operation is "ERROR" (Step S209/ERROR), the process ends without moving the hand 51. In this case where the interference-accompanying operation is set in this manner, it is possible not to move the hand 51 within an area where the hand 51 potentially interferes with the surrounding environment. It is therefore possible to prevent the hand 51 from interfering with the surrounding environment and from being damaged, and thus the robot 5 can be used for a long period of time. Moreover, since the need to replace the hand 51 is reduced, an environmental load as a production facility can be reduced. Meanwhile, if the interference-accompanying operation is "OUTPUT SIGNAL" (Step S209/OUTPUT SIGNAL), an alarm indicating that the hand 51 is moving in an area where the hand 51 potentially interferes with the surrounding environment is displayed (Step S210) and the arm is then moved to move the hand 51 (Step S204). Even when there is an overlap between the surrounding environment area and the work area, the hand 51 does not necessarily interfere with the surrounding environment in practice. Therefore, an operation efficiency can be improved by setting the interference-accompanying operation in this manner, displaying the alarm and continuing the move of the hand 51. Even if the hand 51 interferes with the surrounding environment, since the alarm is displayed in advance, it is possible to stop the move of the hand 51 by an operation from the T/B 2 before the interference actually occurs, or to stop the move of the hand 51 immediately after the interference occurs. It should be noted that "INVALID" can also be set as the interference-accompanying operation. In this case, the arm 52 is moved to move the hand 51, regardless of the value of the state variable.

Although the case where the automatic operation is performed by executing the operation description program 422 has been described above, it is also possible, at a time of a manual operation where the control program 423 is operated by an operation of the T/B 2 to transmit the control signal to the servo amplifier 44, to prevent the hand 51 from moving or perform the alarm display depending on the state variable if the area-interference check operation is enabled in the initial setting. In this case, it is easy to change or modify the program after moving, by the operation of the T/B 2, the robot 5 to an area where no interference occurs.

According to the present embodiment, as described above, a programmer does not have to separately calculate at each time a condition for interference depending on the surrounding environment, for obtaining the interference state of the robot. Instead, the programmer can easily prepare the interference state by checking the state variable of the robot. Furthermore, the state variable can be easily checked on a computer for creating the program, and the state variable can be checked while being visualized as a three-dimensional cubic diagram.

REFERENCE SIGNS LIST

1 three-dimensional vision sensor
2 T/B
3 computer
4 robot control apparatus
5 robot
11 imaging unit
12 robot-coordinate generation unit
41 I/F
42 storage unit
43 control unit
44 servo amplifier
51 hand
52 arm
421 parameter
422 operation description program

The invention claimed is:

1. A robot control apparatus that causes a robot provided with a hand on an end of an arm to perform a pick-up operation that uses the hand to grasp and move a workpiece detected by a workpiece detection unit, the robot control apparatus comprising:

a parameter storage unit configured to store a first parameter and a second parameter, wherein the first parameter defines a position and a geometric shape of a non-interference area in which no interference occurs between the hand and a surrounding environment, and the second parameter defines a geometric shape and a size of a work area through which the hand potentially passes when moving to grasp the workpiece;

a program execution unit configured to execute an operation description program including a sequence of instructions described corresponding to procedures of the pick-up operation to cause the robot to drive the arm to move the hand;

a work area computation unit configured to read the second parameter regarding the work area from the parameter storage unit and to compute, based on a position and an attitude of the workpiece obtained from the workpiece detection unit, a position and an orientation of the work area with reference to the position of the workpiece detected by the workpiece detection unit;

an overlap computation unit configured to read the first parameter regarding the non-interference area from the parameter storage and to compute an overlap between a surrounding environment area excluding the non-interference area and the work area having the position and the orientation computed by the work area computation unit; and an interference-accompanying operation execution unit configured to execute, if there is the overlap between the surrounding environment area and the work area having the position and the orientation computed by the work area computation unit, a predetermined operation as an interference-accompanying operation in response to the hand going into the work area.

2. The robot control apparatus according to claim 1,
wherein the operation description program includes an instruction to execute an area-interference check operation, and
the work area computation unit, the overlap computation unit, and the interference-accompanying operation execution unit are activated when the instruction to execute the area-interference check operation is executed by the program execution unit.

3. The robot control apparatus according to claim 1, comprising a unit configured to set an operation mode such that the work area computation unit, the overlap computation unit, and the interference-accompanying operation execution unit are activated during which the program execution unit executes the operation description program.

4. The robot control apparatus according to claim 1,
wherein the interference-accompanying operation is to prevent the hand from moving.

5. The robot control apparatus according to claim 1, comprising a unit configured to cause the robot to drive the arm to move the hand, based on a command input from a teaching box.

6. The robot control apparatus according to claim 1,
wherein the parameter storage unit is configured to store a plurality of first parameters regarding a plurality of non-interference areas, and
the interference-accompanying operation execution unit operates while setting, as the surrounding environment area, an area that is not included in any of the plurality of the non-interference areas.

7. The robot control apparatus according to claim 1, wherein the geometric shape defined by the first parameter for the non-interference area comprises one of: a cube, a cylinder, a cone, and a tapered columnar cone.

8. The robot control apparatus according to claim 1, wherein the geometric shape defined by the second parameter for the work area comprises one of: a cube, a cylinder, and a circular cone.

9. The robot control apparatus according to claim 1, wherein the first parameter and the second parameter are stored in the parameter storage unit prior to the program execution unit executing the operation description program.

10. The robot control apparatus according to claim 1, wherein, during the execution of the operation description program, in response to a command for executing an area-interference check operation in the operation description program, for each respective position of the arm, a variable indicating present or absence of an interference is set based on the respective position of the arm and the overlap computed by the overlap computation unit.

11. A method of controlling a robot provided with an arm to perform a pick-up operation and a move operation of a workpiece, the method comprising:
detecting, by a sensor, position and attitude of the workpiece;
setting a plurality of parameters comprising: a position and a geometric shape of a non-interference area in which the arm does not interfere with a surrounding environment when the arm is in a work area to perform at least one of the pick-up operation and the move operation, a geometric shape and a size of the work area obtained based on the detected position and attitude of the workpiece;
executing an operation description program comprising instructions for the arm to perform the pick-up operation and the move operation;
in response to one of the instructions in the operation description program comprising an area interference check operation, computing an overlap between the surrounding environment and the work area using a position of the arm specified in the operation description program, wherein the overlap excludes the non-interference area;
setting a state variable to indicate whether the overlap is present or not; and
in response to the state variable indicating that the overlap is present, performing a predetermined operation comprising at least one of: outputting a warning message and stopping the operation of the arm.

12. The method of controlling the robot according to claim 11, further comprising: determining that the surrounding area has a complex shape; and based on the determining yielding that the surrounding area has a complex shape, generating a plurality of non-interference areas, wherein each of the plurality of non-interference areas has a corresponding parameter comprising the position and the geometric shape of the respective non-interference area.

13. The method of controlling the robot according to claim 11, further comprising indirectly determining the surrounding environment as a space area that excludes the non-interfering area.

14. The method of controlling the robot according to claim 11, further comprising storing the set plurality of parameters separately from the operation description program.

* * * * *